US012214373B2

(12) United States Patent
Volmering et al.

(10) Patent No.: US 12,214,373 B2
(45) Date of Patent: Feb. 4, 2025

(54) APPARATUS AND METHOD FOR PROCESSING SHEAR SENSITIVE COATING COMPOSITIONS

(71) Applicant: Olbrich GmbH, Bocholt (DE)

(72) Inventors: Ingo Volmering, Bocholt (DE); Fabian Schindler, Recklinghausen (DE); Frans Te Welscher, Bocholt (DE)

(73) Assignee: Olbrich GmbH, Bocholt (DE)

( * ) Notice: Subject to any disclaimer, the term of this patent is extended or adjusted under 35 U.S.C. 154(b) by 787 days.

(21) Appl. No.: 17/260,030

(22) PCT Filed: Jul. 18, 2019

(86) PCT No.: PCT/EP2019/069433
§ 371 (c)(1),
(2) Date: Jan. 13, 2021

(87) PCT Pub. No.: WO2020/025349
PCT Pub. Date: Feb. 6, 2020

(65) Prior Publication Data

US 2021/0308711 A1 Oct. 7, 2021

(30) Foreign Application Priority Data

Jul. 31, 2018 (DE) ..................... 10 2018 118 559.6

(51) Int. Cl.
*B05C 1/08* (2006.01)
*B05C 11/10* (2006.01)
*B05D 1/28* (2006.01)

(52) U.S. Cl.
CPC ............ *B05C 1/086* (2013.01); *B05C 1/0813* (2013.01); *B05C 1/083* (2013.01); *B05C 11/1039* (2013.01); *B05D 1/28* (2013.01)

(58) Field of Classification Search
CPC .......... B05D 1/28; B05D 1/086; B05C 1/083; B05C 1/0813; B04C 11/1039
See application file for complete search history.

(56) References Cited

U.S. PATENT DOCUMENTS 4,675,208 A 6/1987 Kageyama et al.
4,868,017 A 9/1989 Hammon et al.
(Continued)

FOREIGN PATENT DOCUMENTS

DE 634610 C 8/1936
DE 34 47 510 7/1985
(Continued)

OTHER PUBLICATIONS

English translation of the International Search Report of the International Searching Authority for International Application PCT/EP2019/069433, mailed Nov. 4, 2019, 3 pages, European Patent Office, HV Rijswijk, Netherlands.
(Continued)

*Primary Examiner* — Joseph A Miller, Jr.
(74) *Attorney, Agent, or Firm* — Jones Day

(57) ABSTRACT

The invention relates to a device for processing shear-sensitive coating compounds (100), with a transfer roller (1) and a doctor blade (2), in particular a comma doctor blade, which are spaced apart from one another to form a coating nip (3), the device further having an outlet nozzle (4) for dosing a coating compound (100), the outlet nozzle (4) facing a lower nip opening (6) of the coating nip (3) with its nozzle opening (5), wherein the device comprises a forced conveying system (7) via which a coating compound (100) is dosed into the coating nip (3), the transfer roller (1) and the doctor blade (2) being arranged next to each other, so that the coating nip (3) is permeable in the vertical direction (z), wherein the coating nip (3) is between 30 and 400 μm and the outlet nozzle (4) is an outlet of a rinsing chamber (8)
(Continued)

arranged below the coating nip (3). A corresponding method is also described.

16 Claims, 5 Drawing Sheets

(56) References Cited

U.S. PATENT DOCUMENTS

| | | | | |
|---|---|---|---|---|
| 6,554,900 | B1 | 4/2003 | Aydin et al. | |
| 2002/0148580 | A1* | 10/2002 | Sugihara | D21H 23/56 118/244 |
| 2018/0133742 | A1* | 5/2018 | Dodds | B05C 1/0869 |

FOREIGN PATENT DOCUMENTS

| | | | |
|---|---|---|---|
| DE | 37 13 278 | | 11/1987 |
| DE | 37 17 882 | | 12/1988 |
| EP | 0 070 705 | | 1/1983 |
| EP | 1 117 488 | | 5/2004 |
| EP | 2 727 652 | | 5/2014 |
| EP | 2646169 | B1 | 2/2017 |
| GB | 2 190 607 | | 11/1987 |
| JP | 2000-084452 | A | 3/2000 |
| JP | 2003251241 | A | 9/2003 |

OTHER PUBLICATIONS

PCT International Preliminary Report on Patentability including English Translation of PCT Written Opinion of the International Searching Authority for International Application PCT/EP2019/069433, issued Feb. 2, 2021, 6 pages, International Bureau of WIPO, Geneva, Switzerland.

* cited by examiner

APPARATUS AND METHOD FOR PROCESSING SHEAR SENSITIVE COATING COMPOSITIONS

The invention is based on an apparatus for processing shear-sensitive coating compounds, the apparatus comprising a transfer roller and a doctor blade spaced apart to form a coating nip. The device further comprises an outlet nozzle for the dosing of a coating compound. Such a device is known from EP 1 117 488 B1. A similar device is described in DE 3717882 A1.

The devices and methods known from the state of the art are used, for example, for coating aqueous dispersions, e.g. for the manufacture of PPE products. Among these devices and methods, the engraved roller process and the doctor blade coating process are particularly noteworthy. A common feature of these methods is that the storage and in some cases also the pre-dosing of the coating compound is realized in areas of the device with very small distances between two walls of the device, for example in the area of the outlet nozzle, which leads to a considerable shear stress of the dispersions. For this purpose, for example, side limiters are used for sealing, or simply the so-called doctor blade as a scraper in an engraved roller coating machine.

As a result, very small gaps of a few µm are created, which in the coating process of shear-sensitive coating compounds lead to unacceptably high shear rates and thus to agglomeration of the coating compound. The latter is undesirable.

It is therefore the object of the invention to propose an apparatus and a method for processing shear-sensitive coating compounds in which agglomerates in the coating compounds are at least largely avoided.

This object is solved by a device with the features of claim 1. The subsidiary claim 10 relates to a corresponding method. Advantageous embodiments are the subject of the dependent claims.

Accordingly, in a device for processing shear-sensitive coating compounds, it is provided that the outlet nozzle with its nozzle opening faces a lower nip opening of the coating nip. The device has a forced conveying system by which a coating compound is dosed into the coating nip. This ensures that the coating compound is subjected to the lowest possible shear rate and avoids long residence times of the coating compound in the coating machine.

It may be provided that the device has a flushing device with a seal-free chamber system. The flushing device can be designed to ensure a homogeneous distribution of the coating compound over the width of the transfer roller. The forced feed system may be designed to dose the coating compound directly into the coating nip under a slight overpressure compared to the atmospheric pressure. In particular, the coating compound can be flushed directly into the coating nip. If the chamber system of the spraying device is designed without seals, it can be avoided that the coating compound is exposed to high pressures in the area of the coating nip, which can lead to agglomeration of the coating compound. Seal-free or free of side-limiting means that the spraying device, e.g. a rinsing chamber with an outlet nozzle, is arranged fluidically permeable relative to the transfer roller. For this purpose, the rinsing chamber and in particular the outlet nozzle can be arranged at a distance from the transfer roller. A gap formed between the spraying device and the transfer roller can be dimensioned so that excess coating compound can flow out of the coating nip via the gap between the spraying device and the transfer roller due to a geodetic pressure difference.

By dosing the coating compound into the coating nip via a lower nip opening of the coating nip, the production of smooth, defect-free layers on continuously flat substrates is achieved, especially in self-adhesive PSA applications and in the processing of paints. Especially aqueous acrylic dispersions with shear-sensitive behavior can be coated agglomerate-free with the devices and methods according to the invention.

Due to the dosing via a lower nip opening directly into the coating nip, a uniform residence time of the coating compoundes in the coating nip is achieved and thus prevents overaging of the coating compound. This also prevents the formation of agglomerates in the coating compound.

The transfer roller and doctor blade may be arranged next to each other so that the coating nip is permeable in the vertical direction. The doctor blade can preferably be a commar doctor blade.

The nozzle opening can be positioned in front of the lower nip opening without contact, whereby the coating compound is flushed into the coating nip under pressure. The contact-free positioning of the nozzle opening in front of the lower nip opening ensures that the coating compound in the coating nip is exposed to atmospheric pressure alone and thus does not undergo any compression or shear stress that could lead to the formation of agglomerates.

The outlet nozzle can be an outlet of a rinsing chamber, which is located below the coating nip, whereby the rinsing chamber preferably still has an inlet for coating compound.

The rinsing chamber can have a recess free drain contour for the coating compound on an outer side facing the transfer roller. The coating compound dosed into the coating nip from below, in particular rinsed coating compound that is not applied to the transfer roller, can run off over the recess free drain contour on the outside of the rinsing chamber.

The rinsing chamber can be arranged above a collecting trough from which coating compound flowing off into the collecting trough via the outside of the rinsing chamber is pumped back into the rinsing chamber.

The coating compound can be pumped from the collecting trough into the dispensing chamber via a pump of the forced conveying system, preferably an eccentric screw pump, whereby the pump is preferably arranged in a coating compound storage tank.

An discharge gap for the discharge of excess coating compound may be formed between the transfer roller and a boundary wall of the outlet nozzle on an outer side of the boundary wall facing the transfer roller. This ensures that excess coating compound can flow off via the discharge gap due to a geodetic pressure difference.

In addition, a nip seal can be formed on the outside of the boundary wall facing the transfer roller. The nip seal can be used to build up a slight overpressure between the nozzle outlet area and the transfer roller to allow full-surface spraying of the transfer roller and to prevent coating compound from flowing out of the spraying area.

In particular, the nip seal can have a distance of 0.01 mm to 0.5 mm, preferably 0.1 mm to 0.2 mm, from the transfer roller.

The nip seal can be part of a nozzle tip which forms the outlet nozzle on its side opposite the nip seal. On the doctor blade side, the nozzle tip can have a surface forming the outlet nozzle. On the transfer roller side, the nozzle tip can have the discharge gap and the nip seal arranged below it. The nozzle tip can be fixed by means of a mounting plate on the upper side of the spray chamber. The nozzle tip can be clamped and/or screwed to the injection chamber by means of the mounting plate. The nozzle tip can be designed in one piece. The nozzle tip can be made of natural or synthetic rubber.

The nozzle tip can be horizontally adjustable to set the pressure ratio between the nozzle orifice and the nip seal.

In addition, the components of the flushing device facing the doctor blade may be sealed off from the doctor blade and the components of the flushing device facing the transfer roller may be contactless. The flushing device may in particular comprise the rinsing chamber and the nozzle tip, whereby the rinsing chamber on the doctor blade side may comprise the coating compound inlet, a coating compound reservoir as well as an area tapering towards the outlet nozzle. On the transfer roller side, the rinsing chamber has an outer side through which excess coating compound can drain off.

The device can also have a mating roller, which is designed to press a web of material against the transfer roller. The coating compound can be a flowable material, preferably a dispersion, for example an adhesive.

The transfer roller can be a chrome-coated steel roller. The backing roller may have a jacket of ethylene-propylene-diene monomer rubber (EPDM) with a hardness of 65 Shore A. The coating compound can, for example, be a dispersion with a viscosity of 1,200 mPa·s at a solids content of 58.7%. The circulation speed of the transfer roller can, for example, be 20 to 80 m/min. The coating nip can be 50 μm, for example. The above numerical values are only exemplary and are not intended to limit the subject matter of the invention to corresponding embodiments.

According to another aspect of the invention, a method for processing shear-sensitive coating compounds is proposed which comprises the following steps:

- providing a rotationally driven transfer roller and a doctor blade, preferably a comma doctor blade, spaced apart to form a coating nip; and
- Dosing of a coating compound into the coating nip with a forced conveying system. The nozzle opening is positioned in front of a lower nip opening of the coating nip without contact and the coating compound is flushed into the coating nip.

The coating compound can be flushed into the coating nip from below (upwards) in vertical direction.

The coating compound can be flushed into the coating nip without any side limiter so that excess coating compound can flow off.

The coating compound can be dosed into the coating nip via an outlet nozzle, whereby a drainage gap is formed between a boundary wall of the outlet nozzle on an outer side of the boundary wall facing the transfer roller and the transfer roller, so that excess coating compound flows off via the drainage gap due to the geodetic pressure difference.

The coating compound can be dosed into the coating nip via an outlet nozzle, whereby the outlet nozzle is an outlet of a rinsing chamber and coating compound flowing off into a collecting trough via the outside of the rinsing chamber is pumped back into the rinsing chamber.

Further details of the invention are explained using the figures below. Here shows:

Figure 3:
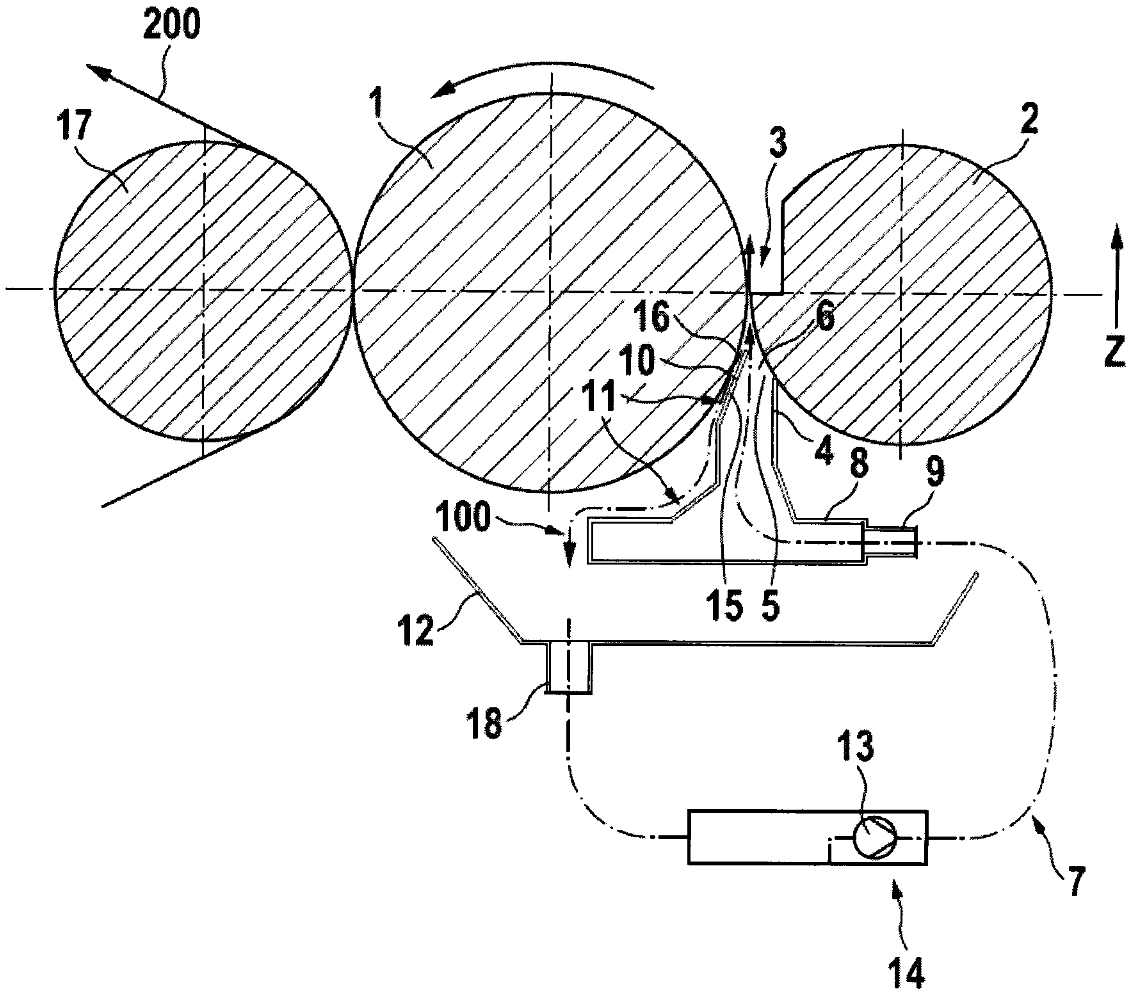
Figure 4:
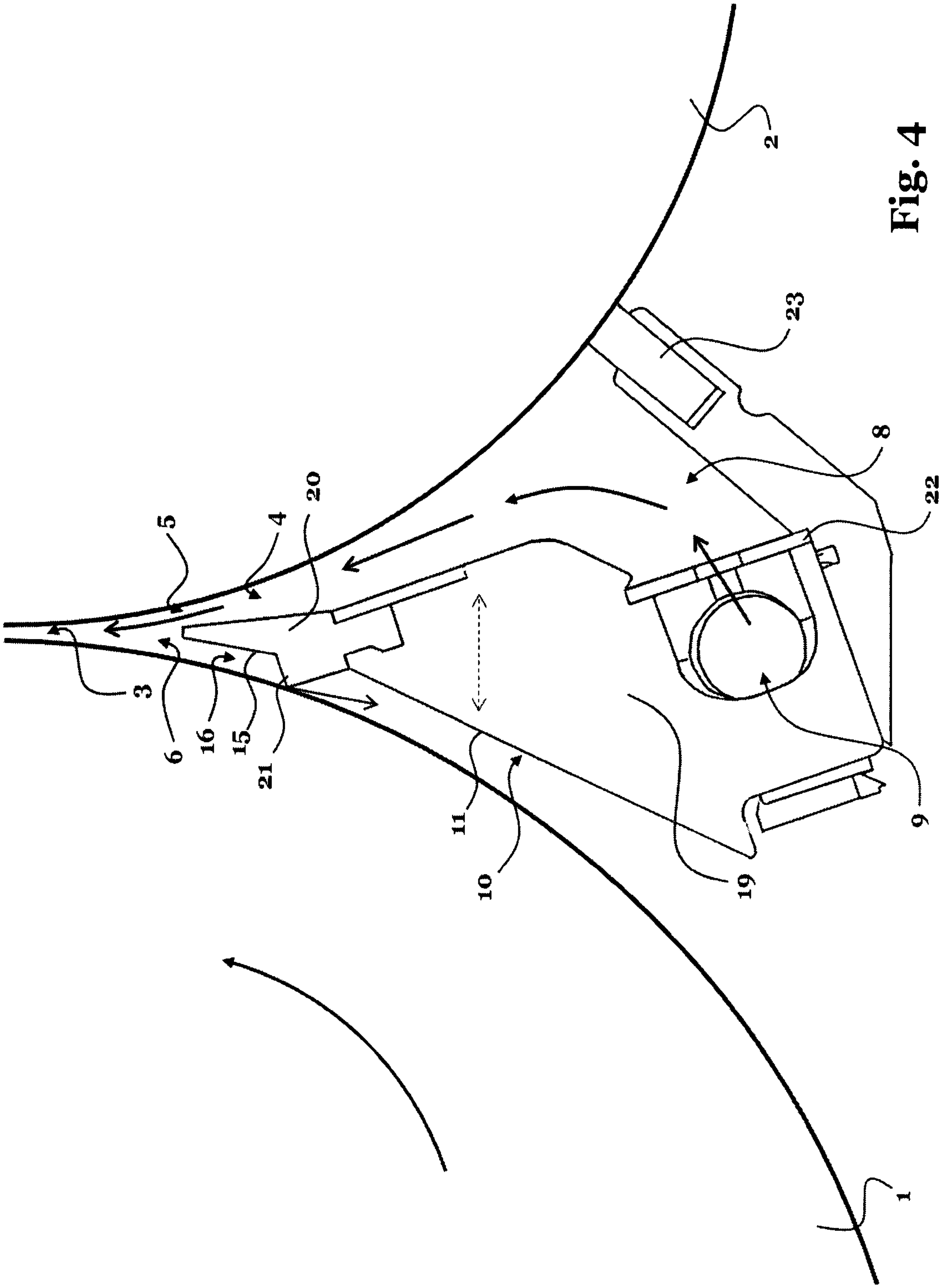
Figure 5:
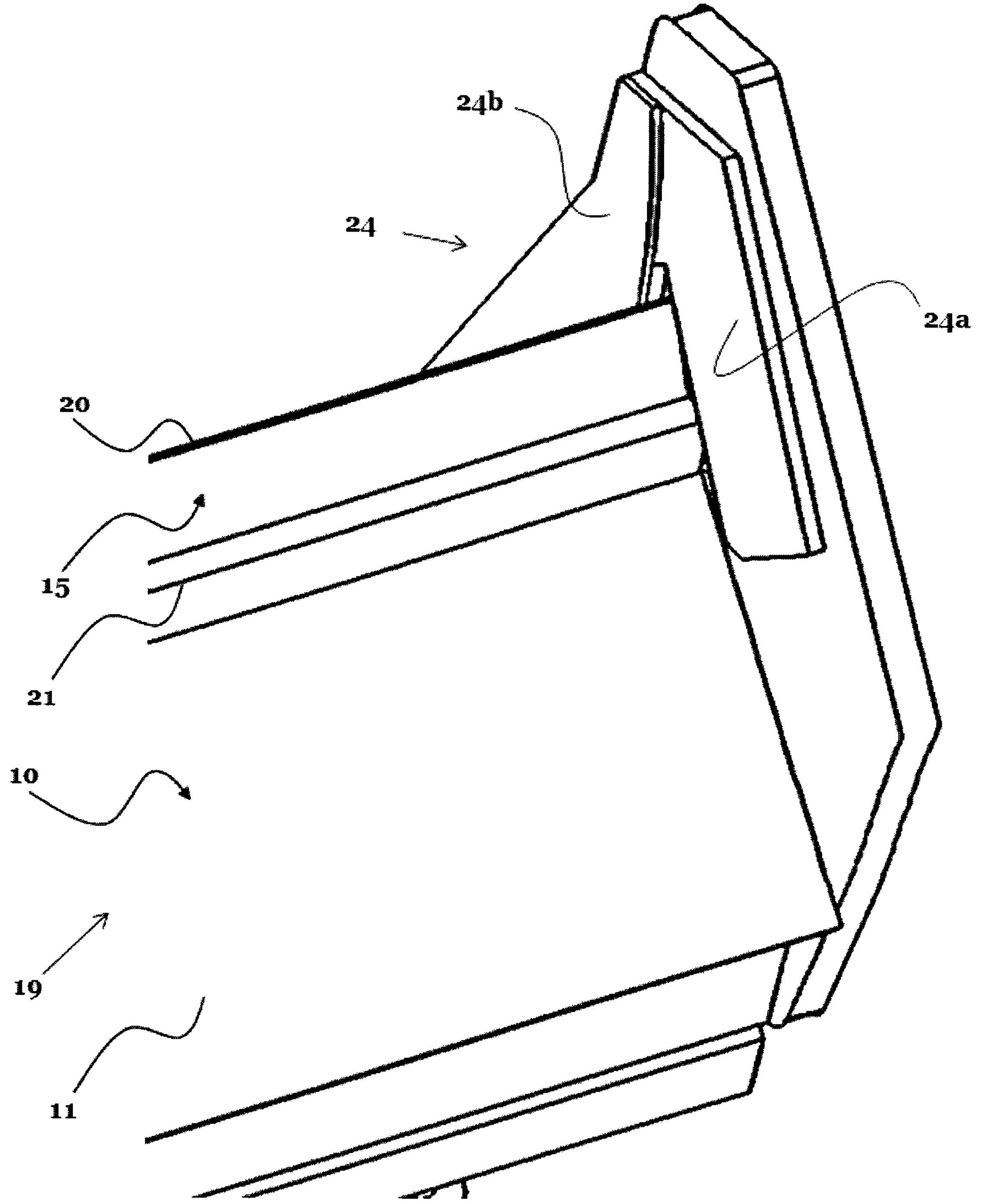

FIG. 3 a schematic cross-sectional view of another exemplary embodiment of a device according to the invention;

FIG. 4 a schematic cross-sectional view of a detailed representation of the injection area; and FIG. 5 shows a perspective view of the back of the flushing device.

Figure 1:
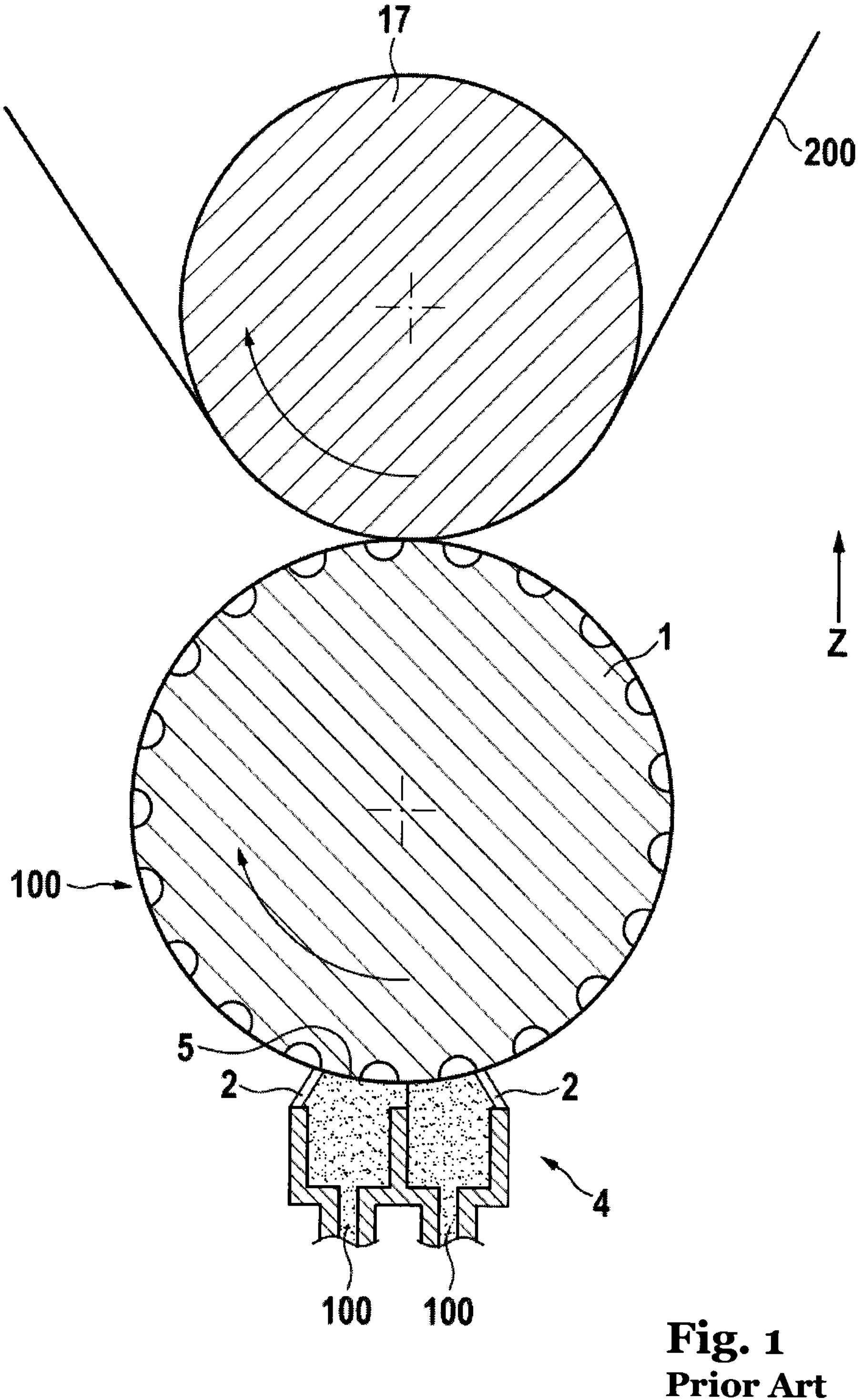
Fig. 1 Prior Art
FIG. 1 shows a state-of-the-art device.

FIG. 1 shows an exemplary device for processing coating compounds 100 such as dispersions, e.g. adhesives, as known from the state of the art. Here, a mating roller 17, a transfer roller 1 and an outlet nozzle 4 for dosing a coating compound 100 are arranged one above the other in the vertical direction z, with the outlet nozzle 4 with its nozzle opening 5 facing a lowest position of the transfer roller 1 and arranged directly adjacent to it and thus sealing against it. In particular, the outlet nozzle 4 is sealed off from the environment of the device by means of the blades 2 arranged on opposite sides of the outlet nozzle 4 in the direction of rotation of the transfer roller 1. In this process, the coating compound 100 is applied to the circumference of the transfer roller via the outlet nozzle 4 with the aid of an overpressure relative to atmospheric pressure and is brought to a desired coating thickness with the aid of the opposite blades 2, whereby the coating compound 100 is subjected to high shear rates, which leads to agglomerates in the coating compound 100.

The device shown has the disadvantage that for effective application of the coating compound 100 on the transfer roller 1, the coating compound 100 must be dosed under a comparatively high pressure onto the transfer roller 1, which leads to the formation of the mentioned agglomerates in the coating compound 100, which impairs the quality of the coating on the transfer roller 1 and thus also reduces the quality of the coating compound layer produced on the material web 200.

Figure 2:
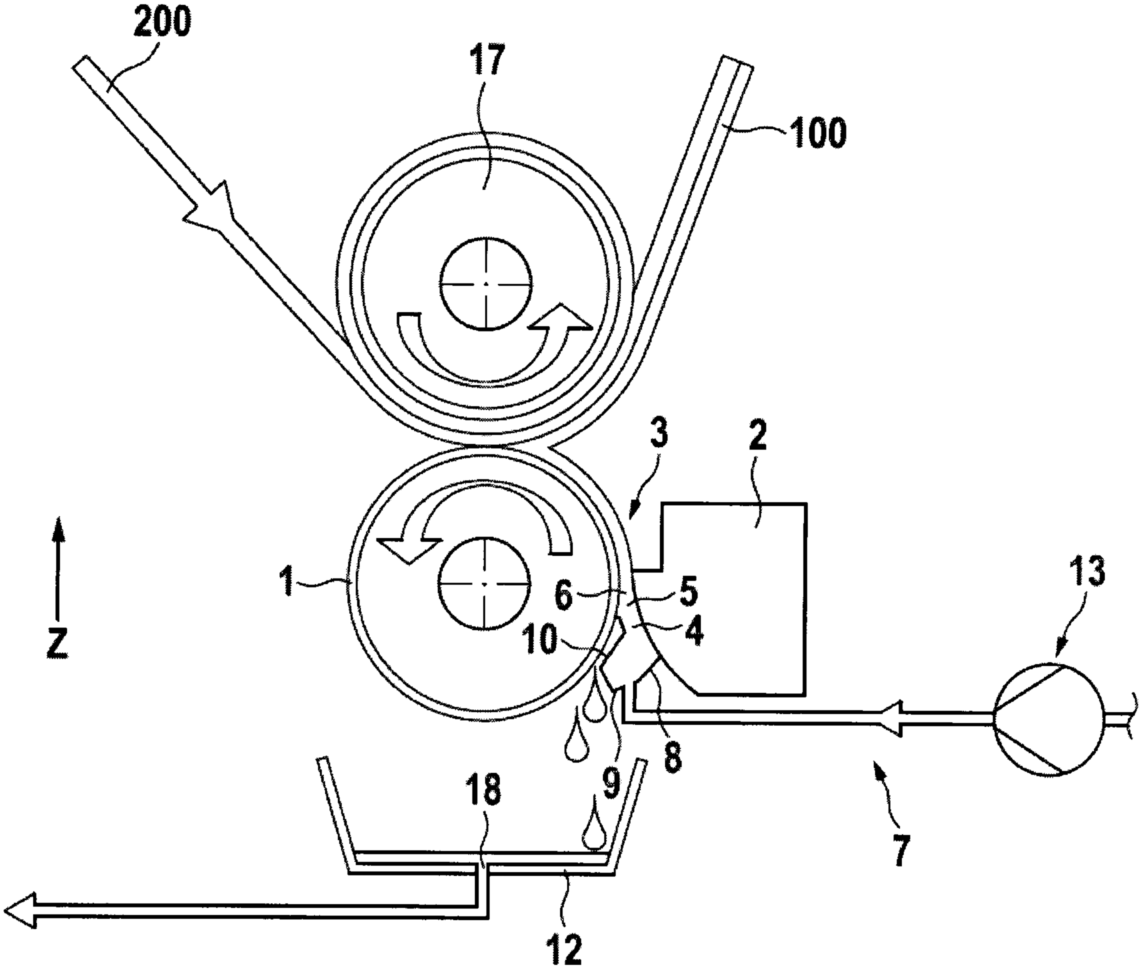
FIG. 2 shows a schematic cross-sectional view of an exemplary embodiment of a device according to the invention.

To solve this problem, a device as shown in FIG. 2 can be used. This device has a transfer roller 1 and a doctor blade 2, which is designed as a comma doctor. The transfer roller 1 and the doctor blade 2 are arranged horizontally next to each other forming a coating nip 3. The coating nip 3 can have a minimum nip width of 50 μm, for example. Due to the horizontal arrangement of the transfer roller 1 and the doctor blade 2, a passage direction of the coating nip 3 extends essentially in vertical direction z. For the realization of the invention, however, it is not essential that the transfer roller 1 and the doctor blade 2 are arranged exactly horizontally next to each other. It is rather important that the resulting coating nip 3 between transfer roller 1 and doctor blade 2 has a vertical component in its direction of extension. In any case, however, it must be avoided that transfer roller 1 and doctor blade 2 are arranged vertically one above the other, as is the case with the state of the art devices shown in FIG. 1.

The device has an outlet nozzle 4 for dosing the coating compound 100, which with its nozzle opening 5 faces a lower nip opening 6 of the coating nip 3. The coating compound 100 is dosed from below into the coating nip 3 via a forced conveying system 7 of the device. In particular, the nozzle opening 5 is positioned in front of the lower nip opening 6 without contact, so that the nozzle opening 5 is in contact with the environment of the device, i.e. with atmospheric pressure. Even a slight overpressure of the coating compound 100 is sufficient to flush the coating compound 100 via the nozzle opening 5 into the coating nip 3. In particular, the nozzle opening 5 can be aligned in vertical direction so that the pressure at which the coating compound 100 is supplied via the nozzle opening is adjusted in such a way that effective wetting of the coating nip with the coating compound 100 is achieved. Pressurization of the coating compound 100 beyond this is not necessary and should be avoided in order to prevent the formation of agglomerates in the coating compound 100.

The outlet nozzle 4 is located at the upper end of a rinsing chamber 8, which is located below the coating nip 3. Via an inlet 9, the coating compound 100 is fed into a forced feed system 7, which has a pump 13. In order to achieve the lowest possible compression of the coating compound 100 within the pump 13, the pump 13 is preferably an eccentric screw pump.

On its outside and facing the transfer roller 1, the rinsing chamber 8 has a recess free drain contour 11, over which excess coating compound can flow off unhindered. In order to facilitate the flow of the excess coating compound over the recess free drain contour 11 of the rinsing chamber 8, it may be provided that the rinsing chamber 8 is sealed against the doctor blade 2.

The rinsing chamber 8 is arranged above a collecting trough 12 in which the excess coating compound 100, which flows back from the coating nip 3 via the drain contour 11 of the rinsing chamber 8, is collected.

As shown in FIG. 3, it can be provided that the coating compound 100 flowing out of the outside 10 of the rinsing chamber 8 into the collecting trough 12 is pumped back into the rinsing chamber 8. Flushing the coating nip 3 "from below" favors a short residence time of the coating compound in the coating nip 3 and thus good preservation of the dispersive properties of the coating compound 100. Since the coating compound 100 remains in constant motion and is exposed to only comparatively slight overpressures relative to atmospheric pressure, the formation of agglomerates is effectively suppressed. The coating compound 100 can be transported from the collecting trough 12 via an outlet 18 to a coating compound storage tank 14 and from there via the inlet 9 back to the rinsing chamber 8. The pump 13 for transporting the coating compound 100 from the storage tank 14 to the rinsing chamber 8 can be located in the coating compound storage tank 14.

The transfer roller 1 can, for example, be a chrome-coated steel roller. The mating roller can have a jacket of EPDM rubber with a hardness of 65 Shore A. The material web 200 on which the coating compound layer 100 is applied can, for example, be a web of siliconized paper. The gap between doctor blade 2 and transfer roller 1 can be between 30 and 400 μm, for example. The circulation speed of transfer roller 1 can be 5 to 80 m/min. The coating compound layer 100 applied to the material web 200 can have a basis weight of, for example, 30 g/m2 to 200 g/m2. The material data and numerical values mentioned are only exemplary and are not intended to limit the subject matter of the invention to corresponding embodiments.

FIG. 4 shows an embodiment of the invention, which is shown in side view and illustrates the spraying area with transfer roller 1, comma doctor blade 2 and a spraying device arranged centrally in between. The arrow on the transfer roller 1 indicates its direction of rotation. In particular, the flushing device has a nozzle 19, which has an inlet 9 below the coating nip 3, through which coating compound is fed through a distributor plate 23 into the rinsing chamber 8. The coating compound is fed into the inlet at the side, i.e. parallel to the axial directions of the rollers. Preferably, the coating compound is fed from both sides in the area of the front sides of the transfer roller 1 and the doctor blade 2. The distributor plate 23 has several spaced openings perpendicular to the image plane through which the coating compound enters the rinsing chamber 8. The coating compound is first distributed evenly across the width of the sheet and then via the large rinsing chamber 8. The pressure in the rinsing chamber 8 corresponds approximately to the pump pressure of the pump 13. The coating compound is then conveyed in the direction of the coating nip 3 and moves along the tapering contour of the rinsing chamber 8 in the direction of the outlet nozzle 4, which is formed on one side by the doctor blade 2 and on the other side by the horizontally adjustable inner side of the nozzle tip 20. The spray chamber 8 is sealed towards the doctor blade 2 by a flexible gasket 23 so that no overflow occurs at this point. The converging gap between doctor blade 2 and the flushing device produces an increase in the speed of the compound. This causes the speed to approach the surface speed of the transfer roller 1. The arrows in the diagram illustrate the direction of movement of the coating compound. The dotted horizontal arrow indicates the direction of movement of the spraying device.

The nip pressure between the doctor blade 2 and transfer roller 1 must be lower than in the discharge nip 16 between the nozzle tip 20 and the transfer roller 1. As a result, the mass moves with increasing speed into the coating nip 3. The differential speed of the mass to the surface of the transfer roller 1 is so low that the mass is not subject to shear and thus not to a change in viscosity. This results in a uniform coating appearance. In the area of the nip seal 21, the theoretically high flow velocity generates a resistance that settles at the total pressure of the purge area. It must be ensured that the nip seal 21 does not touch the transfer roller 1, but is positioned at a distance of 0.1 mm to 0.2 mm from it. The gap between the nip seal 21 and the transfer roller 1 is therefore very small, so that the speed in this area would have to be very high to allow the downward flow to pass. The transfer roller 1, which rotates in the direction of the discharge gap 16, reduces the leakage, i.e. the coating compound that runs over discharge gap 16 and nip seal 21 in the direction of the outside 10 is reduced by counter-rotating movement of transfer roller 1.

FIG. 5 shows a perspective view of the back of the spraying device. The nozzle tip 20 is located on the top side, which initially has a boundary wall 15 in the downward direction, which forms the discharge gap 16 together with the transfer roller 1. Below this, the gap is tapered to 0.1-0.2 mm by the nip seal. Coating compound that overcomes the nip seal 21 runs over the drain contour 11 of the outside 10 of the flushing device back into the collecting trough 12. Side walls laterally delimit the flushing device, which each have seals 24, which comprise a front part 24*a*, which faces the transfer roller 1, and a rear part 24*b*, which faces the rinsing chamber 8 and the comma blade 2 respectively. The washing chamber 8 is only sealed over the rear section 24*b* towards the doctor blade 2. The front section 24*a* of the seal 24, on the other hand, is stepped over the rear section 24*b* so that the front section 24*a* has no contact with the transfer roller 1 and is leaky. Overflowing coating compound is returned to the mass container via the collecting trough 12.

The features of the invention disclosed in the above description, in the drawings as well as in the claims can be essential for the realization of the invention either individually or in any combination.

LIST OF REFERENCE SIGNS

- 1 Transfer roller
- 2 Doctor blade
- 3 Coating nip
- 4 Outlet nozzle
- 5 Nozzle opening
- 6 Nip opening
- 7 Forced conveying system
- 8 Rinsing chamber

9 Inlet
10 Outside
11 Drain contour
12 Collecting trough
13 Pump
14 Coating compound storage tank
15 Boundary wall
16 Discharge gap
17 Mating roller
18 Outlet
19 Nozzle
20 Nozzle tip
21 Nip seal
22 Distributor plate
23 flexible gasket
**24*a*** lateral seal front part
**24*b*** lateral seal rear part
100 Coating compound
200 Material web
z Vertical direction

The invention claimed is:

1. An apparatus for processing shear-sensitive coating compounds, comprising:

- a transfer roller;
- a doctor blade, wherein the doctor blade is spaced apart from the transfer roller to form a coating nip;
- an outlet nozzle for dosing a coating compound, wherein the outlet nozzle comprises a nozzle opening configured to face a lower nip opening of the coating nip; and
- a forced conveying system via which a coating compound is dosed into the coating nip,
- wherein the transfer roller and the doctor blade are arranged next to each other, so that the coating nip is permeable in the vertical direction (z),
- wherein the forced conveying system is arranged below the doctor blade and the lower nip opening, and
- wherein the coating nip is between 30 μm and 400 μm and the outlet nozzle is an outlet of a rinsing chamber arranged below the coating nip,
- wherein a nip seal is formed on an outer side of a boundary wall of the outlet nozzle facing the transfer roller.

2. The apparatus of claim 1 wherein the doctor blade comprises at least a curved hook portion.

3. The apparatus according to claim 1, wherein the nozzle opening is mounted in front of the lower nip opening without contact, the coating compound being flushed into the coating nip.

4. The apparatus according to claim 1, wherein the rinsing chamber comprises an inlet for the coating compound.

5. The apparatus according to claim 4, wherein the rinsing chamber comprises an outer side configured to face the transfer roller and wherein the outside has a recess free discharge contour for the coating compound.

6. The apparatus according to claim 1, wherein the rinsing chamber is arranged above a collecting trough from which the coating compound flowing off via the outside of the rinsing chamber into the collecting trough is pumped back into the rinsing chamber.

7. The apparatus according to claim 6, wherein the coating compound is pumped out of the collecting trough into the rinsing chamber via a pump of the forced conveying system, the pump arranged in a coating compound storage container.

8. The apparatus according to claim 1, wherein a discharge gap for discharge of excess coating compound is formed between the boundary wall of the outlet nozzle on the outer side of the boundary wall facing the transfer roller and the transfer roller.

9. The apparatus according to claim 1, wherein the nip seal has a distance of 0.01 mm to 0.5 mm from the transfer roller.

10. The apparatus according to claim 1, wherein the nip seal is part of a nozzle tip which forms the outlet nozzle on its side opposite the nip seal.

11. The apparatus according to claim 10, wherein the nozzle tip is horizontally adjustable to adjust the pressure ratio between the nozzle orifice and the nip seal.

12. The apparatus according to claim 1, wherein the components of the rinsing chamber facing the doctor blade are sealed towards the doctor blade and the components of the rinsing chamber facing the transfer roller are designed to be contactless towards the transfer roller.

13. The apparatus according to claim 1, further comprising a mating roller configured to press a material web against the transfer roller.

14. The apparatus according to claim 1, wherein the nip seal has a distance of 0.1 mm to 0.2 mm, from the transfer roller.

15. The apparatus according to claim 1, wherein the coating compound is a flowable material.

16. The apparatus according to claim 15, wherein the flowable material is a dispersion or an adhesive.

* * * * *